(12) United States Patent
Cohen

(10) Patent No.: US 8,073,322 B1
(45) Date of Patent: Dec. 6, 2011

(54) SIMULTANEOUS EXPOSURE OF PARALLEL ROLLS OF FILM FOR EXISTING FILM CAMERAS

(76) Inventor: Evan Morris Cohen, New York, NY (US)

( * ) Notice: Subject to any disclaimer, the term of this patent is extended or adjusted under 35 U.S.C. 154(b) by 0 days.

(21) Appl. No.: 12/850,814

(22) Filed: Aug. 5, 2010

(51) Int. Cl.
*G03B 41/00* (2006.01)
(52) U.S. Cl. ........................................ 396/322; 396/333
(58) Field of Classification Search .................. 396/322, 396/328, 332–333, 353, 429
See application file for complete search history.

(56) References Cited

U.S. PATENT DOCUMENTS

| | | | |
|---|---|---|---|
| 2,565,618 A | 8/1951 | Mourfield | |
| 2,584,373 A | 2/1952 | Thompson | |
| 2,693,137 A | 11/1954 | Roehrig | |
| 2,800,842 A * | 7/1957 | Albrecht | 396/322 |
| 3,618,495 A | 11/1971 | Kuhns | |
| 3,810,213 A * | 5/1974 | Furuoka | 396/328 |
| 3,935,580 A | 1/1976 | Klainos | |
| 4,140,381 A | 2/1979 | Douglas | |
| 4,407,575 A * | 10/1983 | Liu | 396/328 |
| 4,624,541 A * | 11/1986 | Park | 396/373 |
| 5,049,910 A | 9/1991 | Hsiung | |
| 5,055,863 A | 10/1991 | Lindenfelser | |
| 5,357,301 A | 10/1994 | Prosser | |
| 5,515,124 A | 5/1996 | Kurosawa | |

OTHER PUBLICATIONS

Miller, Chuck, "Twice the Film", Jun. 2010 Flicker website http://www.flickr.com/photos/chuckthewriter/sets/72157624446221796/.*

* cited by examiner

*Primary Examiner* — Christopher Mahoney
(74) *Attorney, Agent, or Firm* — Michael J. Feigin, Esq.; Feigin & Associates, LLC

(57) ABSTRACT

Embodiments of the disclosed technology are designed for creation of a photographic image comprising an upper and lower portion from two rolls of film whereby the picture is created by simultaneous exposure within a single camera housing, or emulation thereof. This is accomplished in one embodiment by wrapping two rolls of film around a spool, one above the other, such that the rolls pull off the reel in parallel and onto a single take-up spool. Thus, when the shutter opens, both rolls of film are simultaneously exposed, and an image forms half on one and half on the other. In another embodiment, a camera comprises two film chambers (which may be a single chamber with divider adapting the chamber to hold two rolls of film), one above the other, and a roll is loaded into each film chamber. Embodiments may be used to breathe new life into discontinued film formats, such as 70 mm film cameras by using two 35 mm rolls of film.

17 Claims, 10 Drawing Sheets

SIMULTANEOUS EXPOSURE OF PARALLEL ROLLS OF FILM FOR EXISTING FILM CAMERAS

FIELD OF THE DISCLOSED TECHNOLOGY

The disclosed technology relates generally to film photography, and, more specifically, to film selection in a camera.

BACKGROUND OF THE DISCLOSED TECHNOLOGY

Film photography has been surpassed by digital photography, and with it, by the expedited death of less popular formats. Film, which has a chemical layer that reacts with the addition of light to record a negative image of the light it is exposed to, is typically loaded into a camera in a film chamber, wrapped around a spool. It is pulled off the spool and onto a take-up spool on the other side of a shutter. A portion of the unrolled film is exposed to light when a shutter opens, a lens focusing light onto the exposed film.

Many formats of film exist in various sizes, various chemical compositions used to form a negative image of light hitting it (or in some cases, a positive image), and come in color, black and white, infrared, and other varieties. Film formats change over time, and, with the prevalence of digital photography, the discontinuation of various film formats is accelerating. Thus, for example, a camera which takes 70 mm film is difficult to use, and manufacture of 116 and 616 film has long been discontinued. Likewise, 620 and 828 roll film is no longer produced by any major film processing company, and 127 film is on manufactured by a single company in Croatia at the time of this writing.

While the prior art has cameras which can hold multiple types of film, most are designed for a single-size film. For example, U.S. Pat. Nos. 2,565,618, 2,584,373, and 2,693,137 allow one to choose between a first roll of film and a second roll of film. While U.S. Pat. No. 5,515,124 discloses the ability to change an image format in a camera, this method, unfortunately, does not breathe new life into old cameras, but rather, new life into old film. A proprietary camera must be used.

Thus, there is a need to draw new life into old cameras, in order to extend their use by enthusiasts, artists, and posterity.

Referring now to FIG. 1, this figure shows the back of a typical camera as known in the prior art. A film chamber 19 holds film, such as 35 mm or 70 mm film (a 35 mm camera is shown in FIG. 1, by way of example). In the case of 70 mm film, reel sizes may be 116 or 616 reels which have different thicknesses. Shutter 20 opens and closes to allow light in, which has been focused by a lens (in most cases). The light exposes an unrolled portion of the film which has notches or sprocket holes adapted for engagement with sprocket teeth 22. In this manner, the film can be unrolled and pulled from the film chamber 19 to a take-up spool 23 by mechanically rotating the sprocket teeth 22. Film pressure plate 24 and the camera back cover 25 keep the film flat and unexposed to light when it is unrolled between the spools. Some cameras have a power winder coupler 26, allowing one to insert a tool with rotating head to wind the film quickly. In many cameras, an internal motor exists to accomplish this, and may be activated by a rewind button 27. Film rail 28 and film guide rail 29 further ensure that the film remains in its proper place, in order to ensure the precise positioning of negative pictures on the film and that the film does not get stuck. (If the film did get stuck, the camera would have to be opened under infrared, low intensity, or pitch black light conditions (depending on film type), in order to ensure that photographs on the film are not ruined by over-exposure to light). For purposes of this disclosure, a "film rail" is defined as a portion above a space for the shutter opening, or below a space for the shutter opening. An edge of film may rest on the film rail, may be engaged with sprockets on the film rail, or may pass between upper and lower film rails. Other features of typical cameras include tripod sockets 30 for mounting the camera on a tripod, a battery chamber 31 where the camera's battery is stored, and other buttons 32.

SUMMARY OF THE DISCLOSED TECHNOLOGY

The disclosed technology allows new uses for outdated cameras, such as by way of loading a 70 mm camera with two rolls of 35 mm film. Still further, a new artistic effect is created by way of embodiments of the disclosed technology.

In a method of loading film into a camera, in an embodiment of the disclosed technology, the camera comprises a single film chamber and upper and lower rails which may have sets of sprocket teeth integrated (fixedly attached, and perhaps partially hidden beneath the surface when the back of the camera is opened) into the camera. Such a camera is of a type typically known in the art of film photography which takes up film on a roll. The method comprises rolling, in parallel, two rolls of film onto a film reel, such that the two rolls do not overlap. The reel with two rolls of film rolled thereon is placed into the single film chamber of the camera. The first roll of film may be engaged with an upper length of sprocket teeth, and the second roll of film may be engaged, at a lower side, with lower sprocket teeth of the camera when loaded in the camera.

For example, the above method may be used to place two rolls of 35 mm film into a camera adapted for use of 70 mm film. Or, in another embodiment, the two rolls may be any size (standard or non-standard) and can be of equal or different widths. An undevelopable area on a resulting photograph produced by the camera after carrying out the above method results in undevelopable areas of a photograph, in such embodiments. Such undevelopable areas correspond to four rows of sprocket holes (two rows for each roll of film) and, typically, a space between imprints on the photograph left by each roll of film. "Undevelopable," for purposes of this disclosure, is defined as being unable to produce a complex image. In the case of film, an undevelopable portion is a portion of film, or a space outside of the film, incapable of chemically reacting to light to produce a version of an image of the light. In embodiments, a shutter of the camera opens and portions of each roll (i.e., typically, an equal length of each roll) of film are exposed simultaneously.

In another embodiment of the disclosed technology, a camera itself is adapted for exposure of an image on two rolls of film simultaneously. To carry this out, the camera has two film chambers for placement of the film. Narrow edges (sides) of each film chamber are adjacent to each other and four rows of sprockets extend at least partially between, and perpendicular to, the film chambers and a take-up spool or spools. Two rows of the sprockets are used for one roll of film, and two rows for another roll of film. An optical system configured to simultaneously expose both a portion of the first roll of film and an equal length portion of the second roll of film is employed.

A developed photograph produced from an equal length of the first and second rolls of film has an upper and lower portion, in embodiments of the disclosed technology. Each portion may further have an undevelopable region in the shape of sprocket holes of the roll of film, or a digitally produced photograph may emulate such a photograph produced with the device described above. When actual film is used, the first roll of film may be chemically different from the second roll of film, such that the produced photograph may have an upper portion in color with a lower portion in black and white, or the upper and lower portions just look different (such as in color shift or color intensity) due to different films used.

A camera adapted for exposure of an image on a single roll of film is also disclosed. A single film chamber is loaded with a single spool, and the spool is wrapped with two separate lengths of film arranged next to each other on the spool. An upper and lower set of sprocket teeth extending at least partially between, and perpendicular to, both the film chamber and a take-up spool is used, whereby a first length of film of the two separate lengths of film have sprockets engaged with the upper sprocket teeth, and a second length of film of the two separate lengths of film has sprockets engaged with the lower sprocket teeth. The first length of film and the second length of film are spaced apart in embodiments of the disclosed technology. In other embodiments, the two rolls of film abut one another or are spaced one right next to the other to produce a continuous or near-continuous (gap of less than 1 mm between negatives) picture across two rolls of film.

The first length of film and the second length of film may be of identical length and width, but may differ chemically, such as, one being a color film and the other a black and white film. A digitally produced photograph emulating a photograph produced by way of such a camera is also claimed.

Further, a photograph is disclosed in embodiments of the disclosed technology, the photograph having an upper portion with an image of undeveloped upper and lower sprocket holes on film; a lower portion, parallel to the upper portion, comprising an image of undeveloped upper and lower sprocket holes on film; a central region between the upper and lower portions with a width less than 10% of the width (and may be a hairline width, that is, any viewable width) of the upper and the lower portion. The photograph further has an image of an undeveloped space between films, in some embodiments of the disclosed technology. Such a photograph may be produced by way of light entering through a single lens, where the upper and the lower portions of the photograph are simultaneously exposed to light. This may be done with two rolls of 35 mm film or produced by way of digital manipulation.

In accordance with these and other objects which will become apparent hereinafter, the disclosed technology will now be described with particular reference to the drawings.

A better understanding of the disclosed technology will be obtained from the following detailed description of the preferred embodiments taken in conjunction with the drawings and the attached claims.

DETAILED DESCRIPTION OF EMBODIMENTS OF THE DISCLOSED TECHNOLOGY

Embodiments of the disclosed technology are designed for creation of a photographic image comprising an upper and lower portion from two rolls of film, whereby the picture is created by simultaneous exposure within a single camera housing, or emulation thereof. This is accomplished in one embodiment by wrapping two rolls of film around a spool, one on top of the other, such that the rolls pull off the reel in parallel and onto a single take-up spool. Thus, when the shutter opens, both rolls of film are simultaneously exposed and an image forms half on one and half on the other. In another embodiment, a camera comprises two film chambers, one above the other, and a roll is loaded into each film chamber.

The disclosed technology will become clearer in light of the description of the figures.

Figure 2:
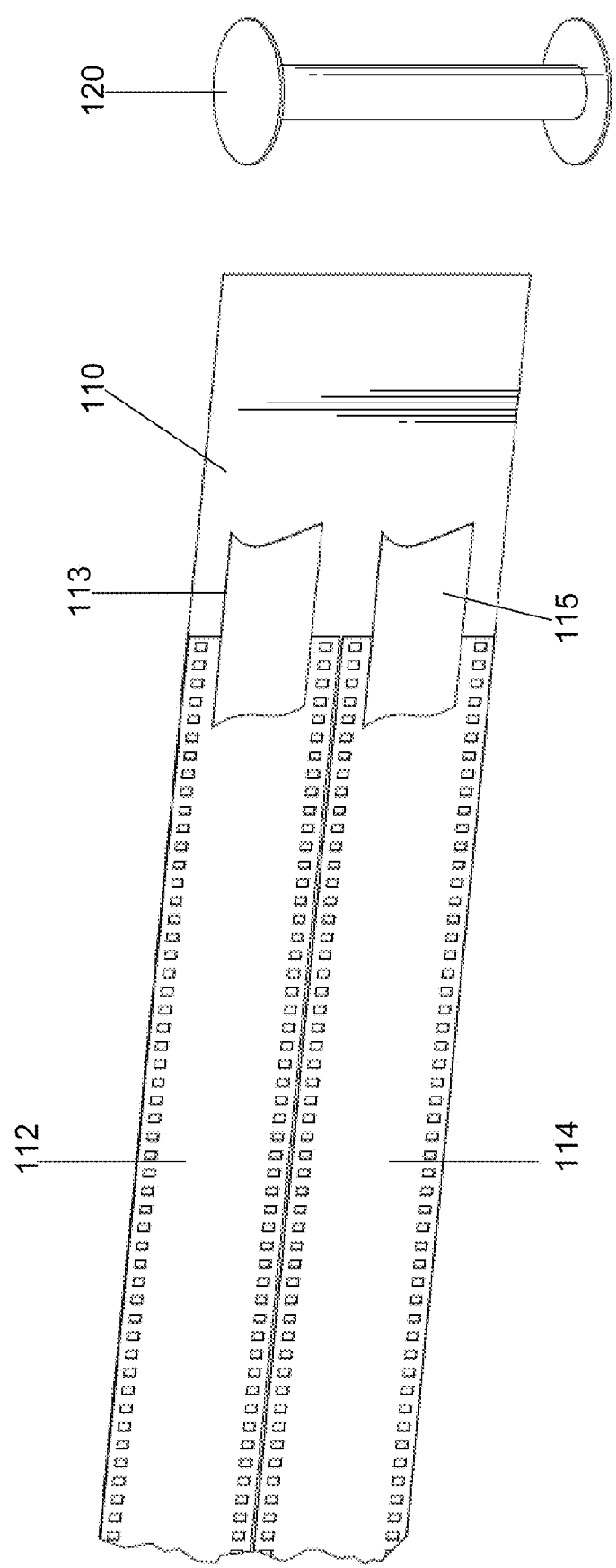
FIG. 2 shows rolls of film placed side by side for use with embodiments of the disclosed technology.
Figure 2A:
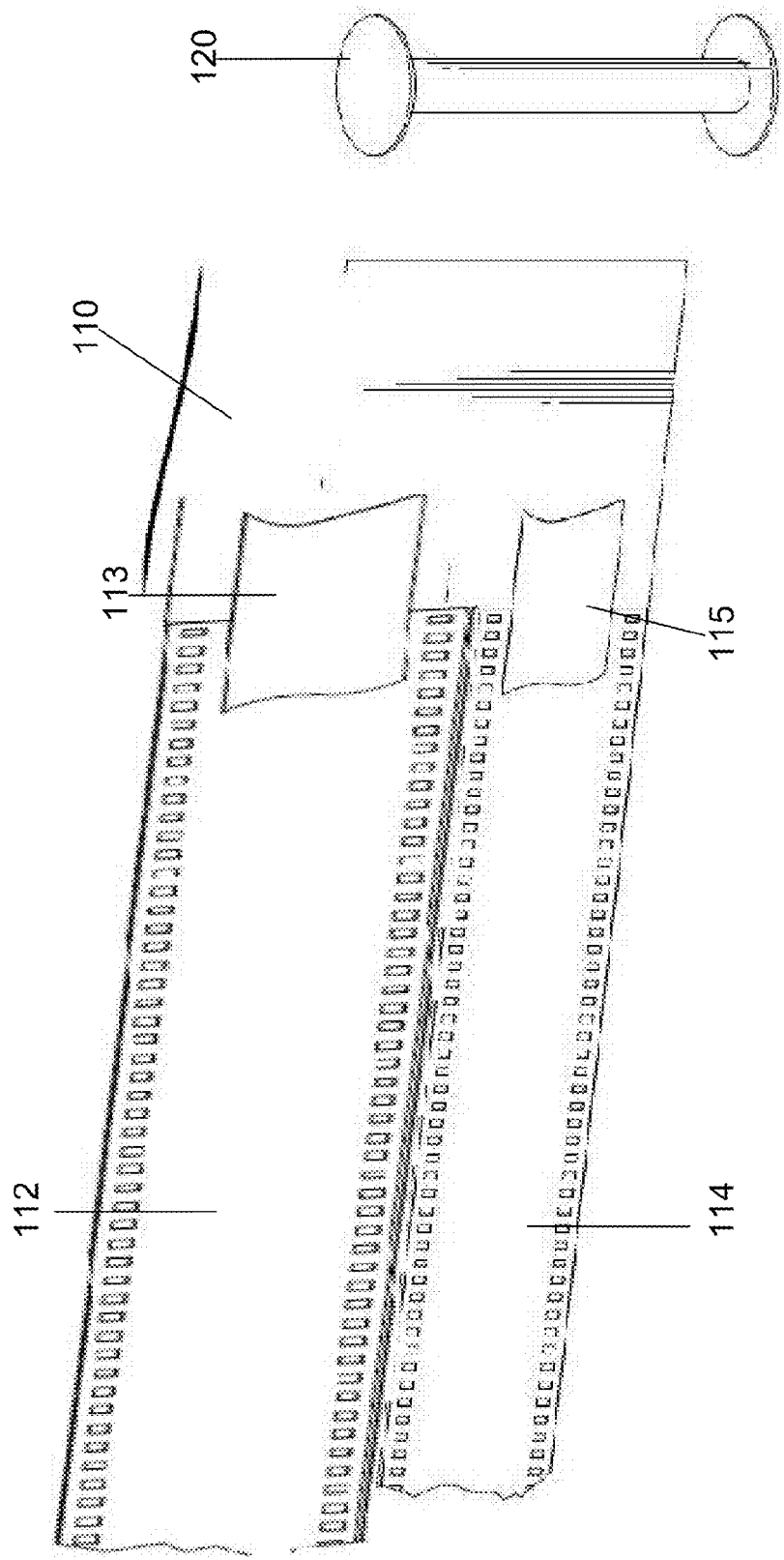
FIG. 2A shows two different sized rolls of film placed side by side for use with embodiments of the disclosed technology.

FIG. 2 shows rolls of film placed side by side for use with embodiments of the disclosed technology. In this case, the two lengths of unrolled film 112 and 114 are of equal width, though varying width film may be used, such as shown in FIG. 2A. For example, roll 112 and roll 114 may be 35 mm film. They are unrolled (in an infrared light, zero light, or other darkroom light condition) and attached to a backing 110, in this case, by using tape pieces 113 and 115. The backing 110 is attached around a reel or spool 120. When using a 70 mm reel, two types of reels are generally known in the art—the 116 reel and the 616 reel. Thus, the appropriately-sized reel must be used. That is, the reel must match the camera in which it will be used. In embodiments of the disclosed technology, in order to avoid jamming, unnecessary tape, and/or user error in preparing the film, tape is only used at the beginning of the winding of the film on the reel. The lengths of film used, 112 and 114, by way of example, may be identical in length and width. As noted above, the width of the two films may be different, but the length is generally equal or nearly equal, in order to ensure proper passage from one spool to another in the camera, as well as proper detection of the position of the rolls in the camera.

Figure 3:
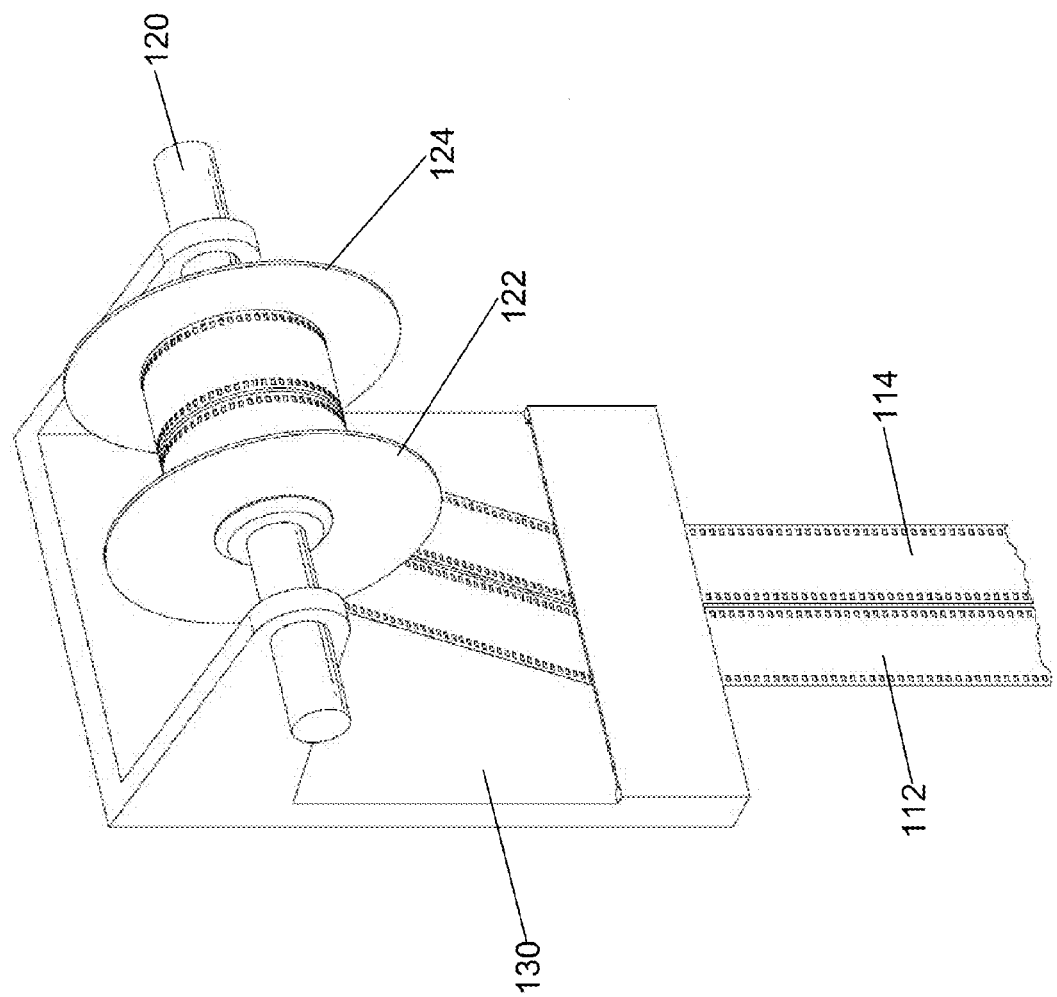
FIG. 3 shows a reel apparatus used for unwinding film onto a reel in an embodiment of the disclosed technology.
Figure 4:
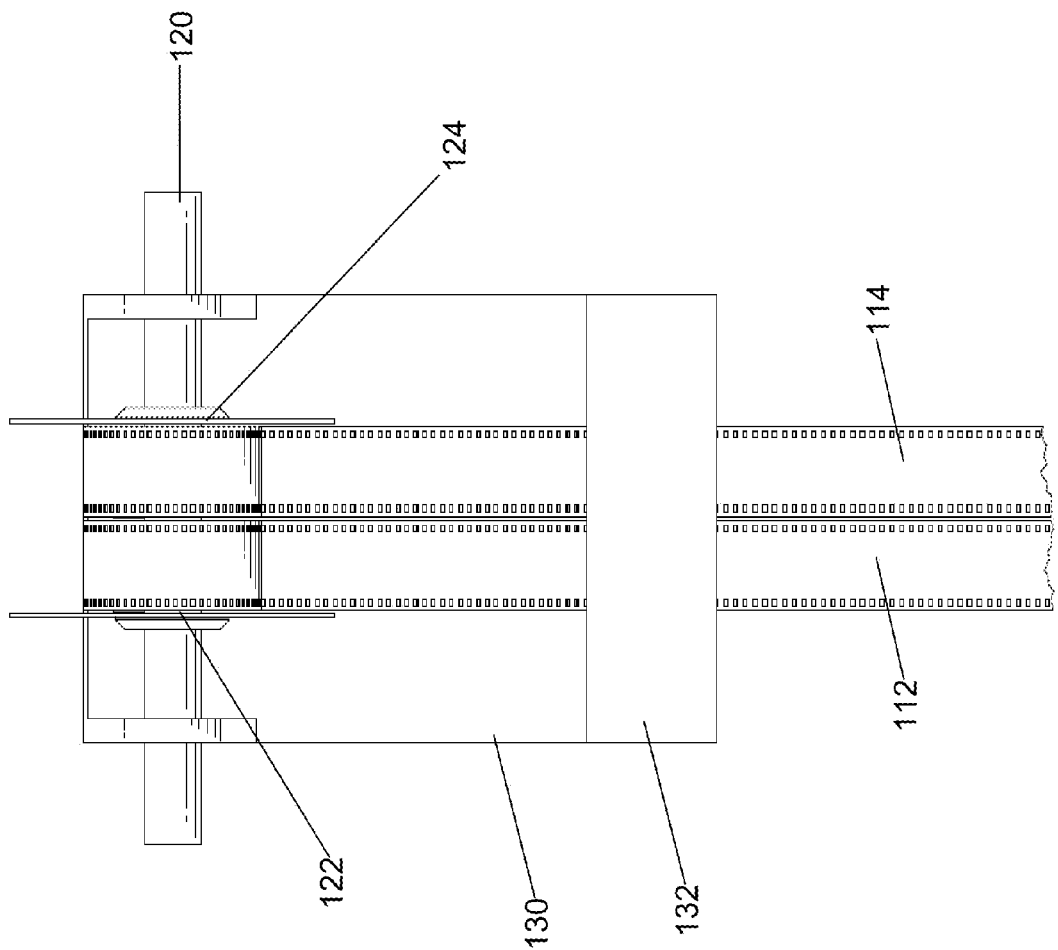
FIG. 4 shows a front view of the reel apparatus with film of FIG. 3.

FIG. 3 shows a reel apparatus used for unwinding film onto a reel in an embodiment of the disclosed technology. A similar reel may be used to aid in winding of film in embodiments of the disclosed technology. FIG. 4 shows a front view of the reel apparatus with film of FIG. 3. A top and bottom flange 122 and 124 are used, in embodiments, to ensure tight, adjacent winding of the rolls of film (and sometimes backing, not shown) onto the reel 120. In this manner, a rolling apparatus 130 may also be used and functions similarly to a standard toilet paper dispenser, or function in reverse. The rolls of film 112 and 114 are pulled onto and rolled around the spool 120. Outer washers may be placed on the outside or inside of the reel, adjacent to the flanges, to prevent slippage or angling of the flanges. Light pressure may be applied on the flanges 122, 124 or objects jutting from the reel 120 to prevent the flanges from moving away from the film.

When such a reel is used for unwinding, that is when, for example, taking film off bulk rolls/dowels to be placed onto a single reel for use in a camera, each bulk spool is placed side by side on a reel (in this case, it may be a simple dowel) 120. The film is pulled down and held in place by a film guard which holds it close to the fixed surface, for ease of management of the film. The film is then pulled down into backing paper which is already mounted to the fixed surface and kept in place by the plastic guides (see FIG. 5 below).

Figure 5:
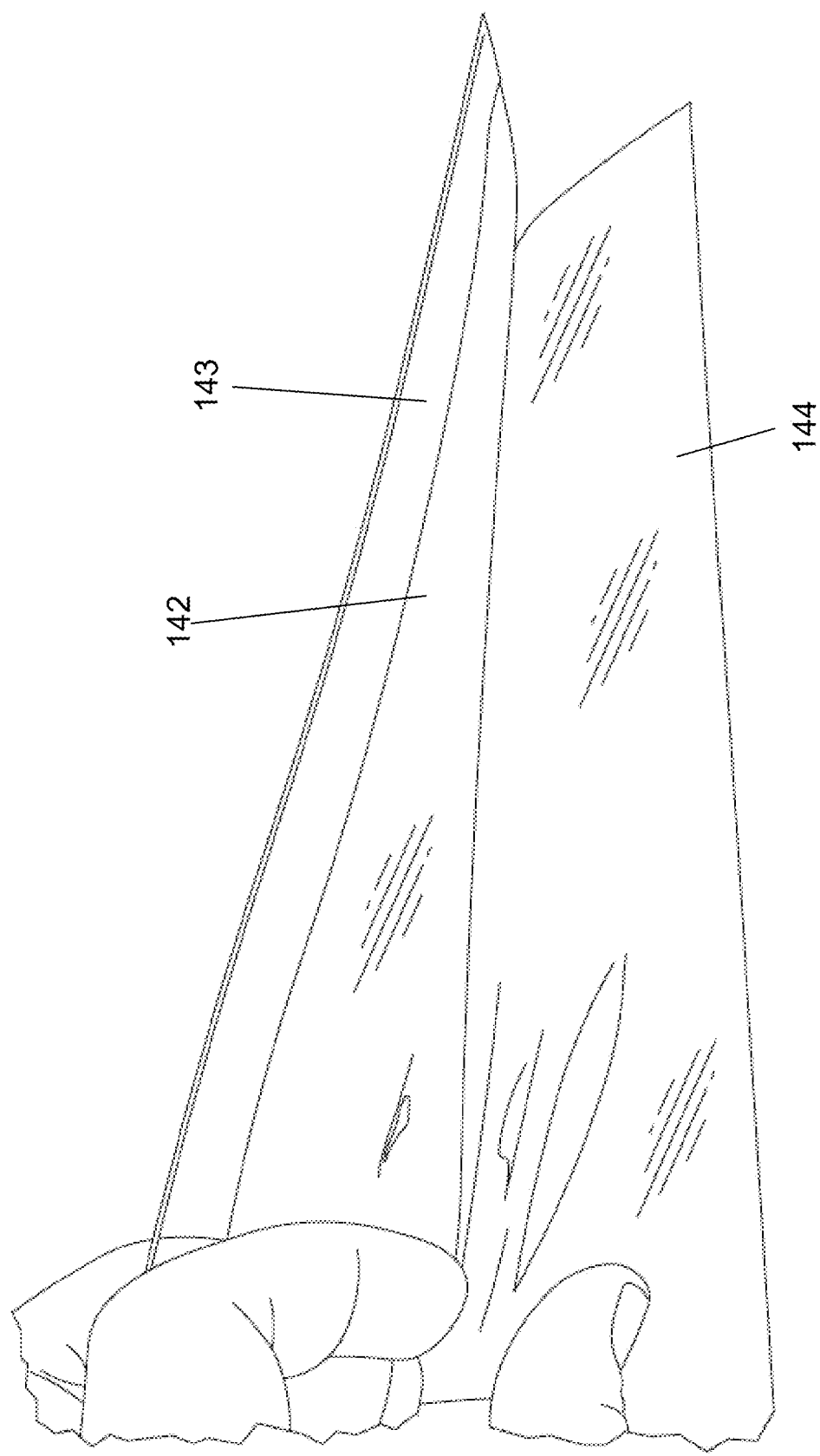
FIG. 5 shows a guide used to align film and backing paper, used in embodiments of the disclosed technology.

FIG. 5 shows a guide used to align film and backing paper in embodiments of the disclosed technology. The guide is affixed to a stationary portion of a wall (and may be affixed, if necessary, to a portion of the reel apparatus. The guide keeps the film in place and may also serve to prevent scratching of the film during rolling. Each film roll passes over both element 142, upper portion 142, and under lower portion 143 in embodiments of the disclosed technology. The guide is typically constructed of a flexible plastic and comprises a lip 143 which extends over a non-lipped portion of the guide to surround film and/or backing paper passing there-through. In embodiments of the disclosed technology, such a guide prevents scratching of the film. The guide may be placed on a length of film, such that the film passes through before it enters the rolling apparatus. The film, may, in other cases pass through as it enters the rolling apparatus (such us under cover portion 132; see FIG. 4). The guides may be any size suitable for the film used, such as 35 mm or 60 mm.

The guide, in embodiments of the disclosed technology, ensures that the edge of the film sits flush with the edge of the backing paper (which is mounted to a fixed surface, such as a wall, in embodiments of the disclosed technology). Flap 144 is tucked under flap 143, so it is completely touching 142. Then the folded over combination of 142 and 144 are slid behind the backing paper with flap 143 extending partially over it. The whole guide is then taped to a fixed surface with the backing paper in place. When the film is drawn down from the roll, it is slipped under flap 143 and pushed against the inner edge, now being flush with the backing paper which is also pushed against that inner edge. This is done with both sides of the backing paper. After one of the film rolls is drawn down, it not only flush with the backing paper, but is also held in place as the other roll of film is drawn down in the same manner.

Figure 1:
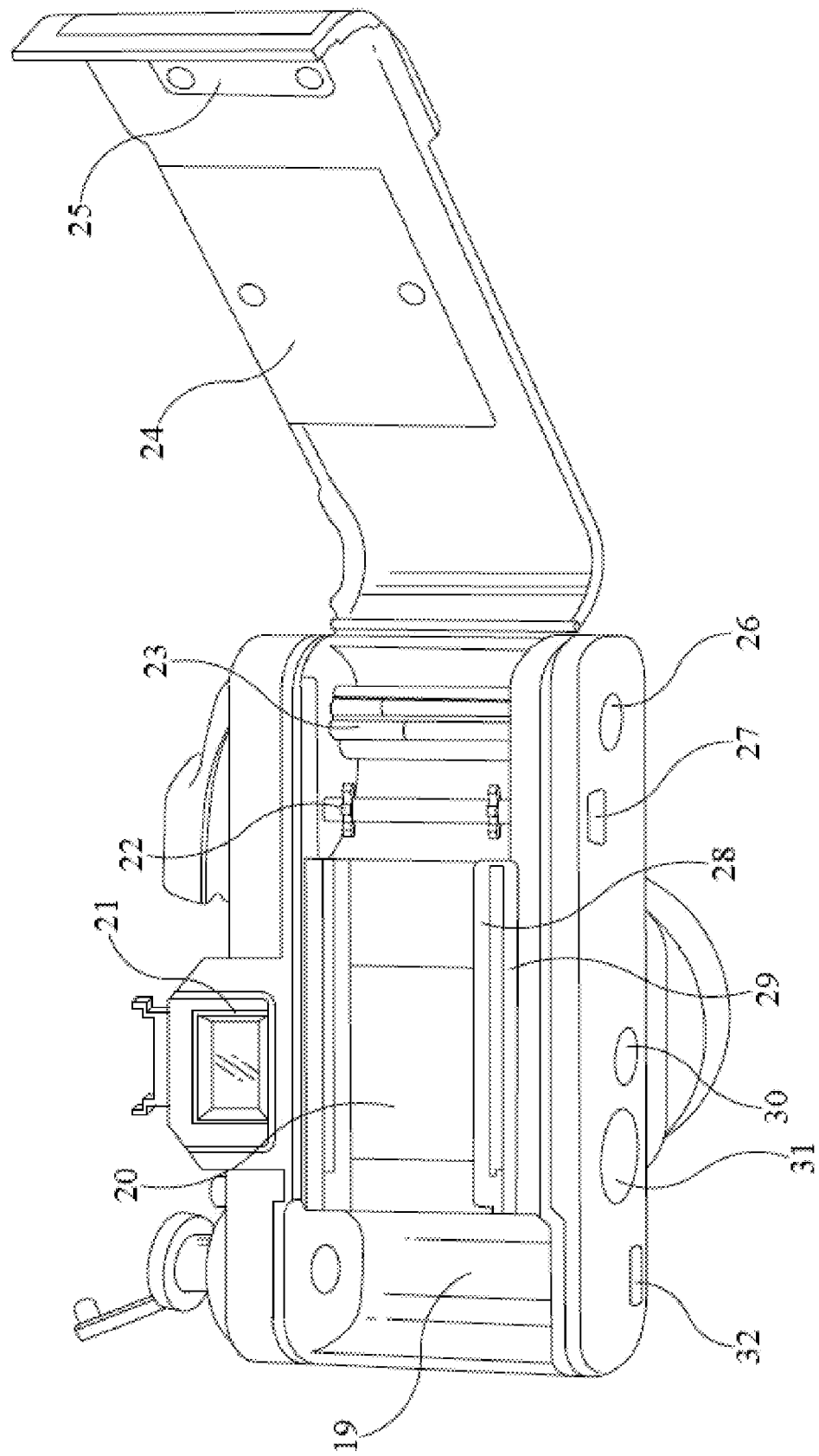
FIG. 1 shows the back of a typical camera as known in the prior art.
Figure 6:
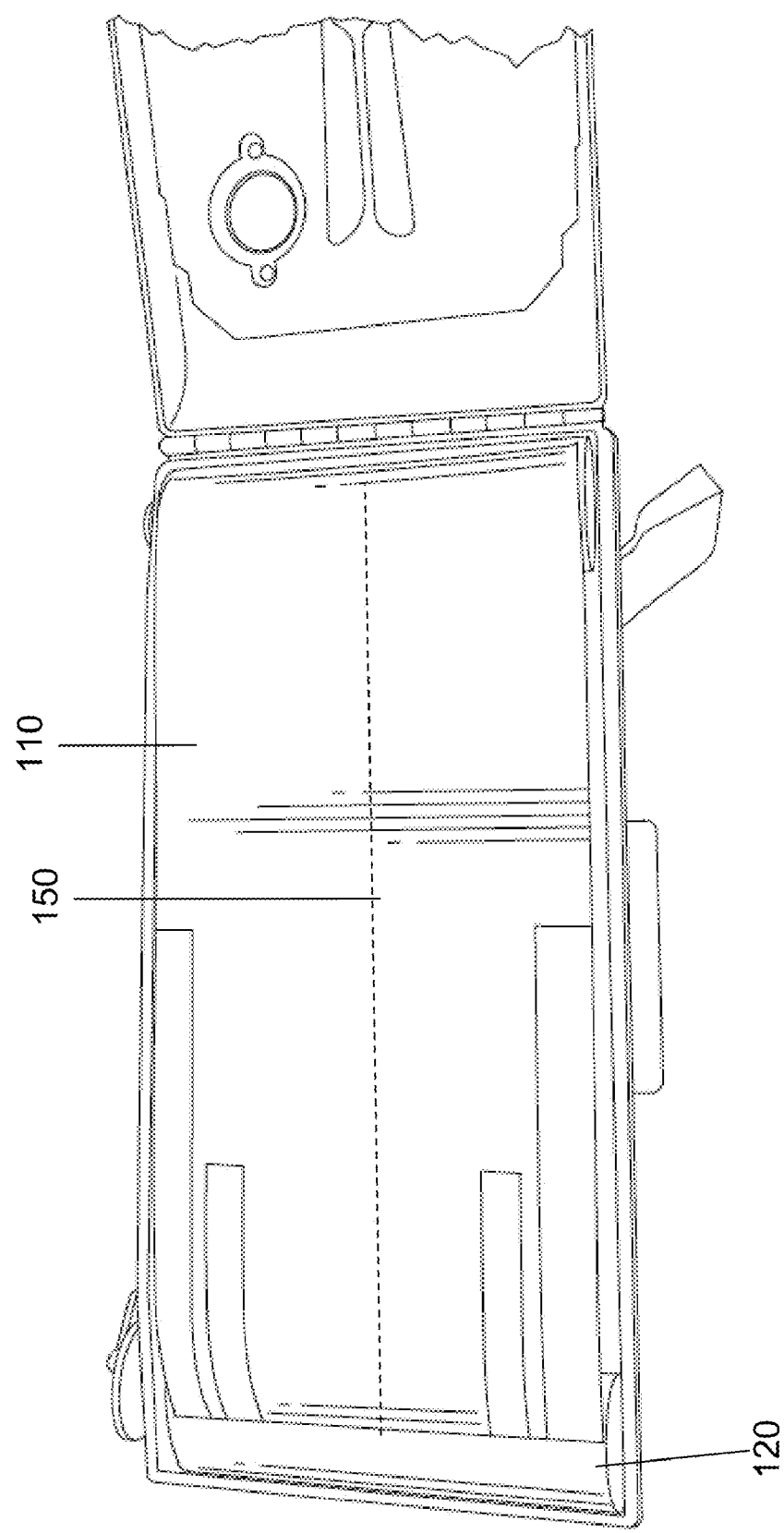
FIG. 6 shows a camera loaded with two rolls of film simultaneously, wrapped around a single reel, in an embodiment of the disclosed technology.

FIG. 6 shows a camera loaded with two rolls of film simultaneously, wrapped around a single reel, in an embodiment of the disclosed technology. For example, a 616 film camera such as a Kodak Junior Six-16 Series II camera may be used, as well as other 70 mm cameras or even 35 mm cameras. The method may be carried out with any known film camera device. Referring to FIGS. 1 and 6 simultaneously, backing 110 is visible in both figures. The film spool 120 is placed into film chamber 19, and the film is pulled over film rails 28 and onto take-up spool 23. The parallel-rolled film is covered by a backing 110, though in embodiments of the disclosed technology, this backing is optional, and the parallel rolls of film are simply rolled around a reel/spool 120. A dotted line 150 represents the boundary between each of two parallel rolls of film. In some embodiments, a space may exist between the edges of each two rolls of film that touch or are adjacent. Thus, a camera, such as the prior art camera of FIG. 1, which is adapted for exposure of an image on a single roll of film, is loaded with two rolls, in parallel, and simultaneously takes a picture on both rolls. A single film chamber 19 is loaded with a single spool 120, the spool wrapped with two separate lengths of film 112 and 114 arranged next to each other on the spool. The upper and lower rails 28 or film guide rails 29 defining a space there-between where light may enter through a shutter. This space extends at least partially between the film chamber 19 and the take-up spool 23. Each of the two rolls of film (the rolls on a single spool) pass over the defined space where light enters from the shutter, and a photograph may then be exposed thereon.

While many older cameras, such as those for use with 70 mm film function by simply pulling non-sprocketed film from a film chamber 19 to a take-up spool 23, most modern film cameras use sprockets 22 to help the film along and better guide it. Thus, in embodiments of the disclosed technology, each rail 28 (defined as an area between the film chamber 19 and take-up spool 23 and on either side of the generally rectangular region which is open to the shutter) comprises sprockets with upper sprocket teeth on an upper rail, and lower shutter teeth on a lower rail. Upper sprocket teeth of said upper rail engage with a first said length of film, and lower sprocket teeth of said lower rail engage with a second length of film.

Figure 7:
FIG. 7 shows an example of a photograph produced using methods and devices of the disclosed technology.

FIG. 7 shows an example of a photograph produced using methods and devices of the disclosed technology. Here, the two rolls of film used are chemically equivalent (e.g., the same brand and make of film). However, in embodiments of the disclosed technology, each roll of film may be of a different type or differ chemically. That is, the compositions of the chemicals used on the film in connection with producing a picture may be different compositions, above a tolerance level known in the art when determining if two rolls of film are considered "the same" or "different" types. For example, one roll of film may be color, another may be black and white. One roll of film may be infrared and another color. One roll of film may produce a certain color palette (e.g., more reds and chrome colors), while another produces a more natural spectrum of colors. Further, each roll of film may be processed independently of the other to produce varying darkroom techniques such as by using different chemicals or different exposures during the developing process.

It should also be noted that the resulting image, such as that shown in FIG. 7, comprises an upper portion 202 produced from a first roll of film and a lower portion 204 produced from a lower roll of film. If film with sprocket holes is used, the sprockets become visible and a space between the two rolls of film may also be visible. The visible space between the two rolls of film is a central region between the upper and lower portions comprising a width less than 10% of the width of the upper and said lower portion 202, 204, or may be non-existent (defined as 1 mm or less for purposes of this disclosure). Such sprocket holes and spaces outside of the film (such as between the two rolls of film) generally produce completely black (or in some instances, completely white) spaces on the developed picture.

Here, it should be noted that the photograph shown in FIG. 7 is significantly wider than what the film was designed for. That is, since the width of the picture is doubled, and in this case, the picture in panoramic (significantly wider than higher, e.g. at a ratio of 16:9 or greater), the imprint of one picture on the negative shown is across the space designed for about five pictures (e.g. 105 mm long), when using a single roll. The reason for this is that the original film was designed for a 35 mm camera, whereas the camera used to take this picture was designed for 70 mm film. When the shutter on the 70 mm-designed camera opened, light entered through the lens into the interior chamber where the film was present and stretched across the opening between the top and bottom rails, as well as the chamber and take-up spool. The portion of the rolls of film across this space were exposed to light and the resulting picture was developed.

Figure 8:
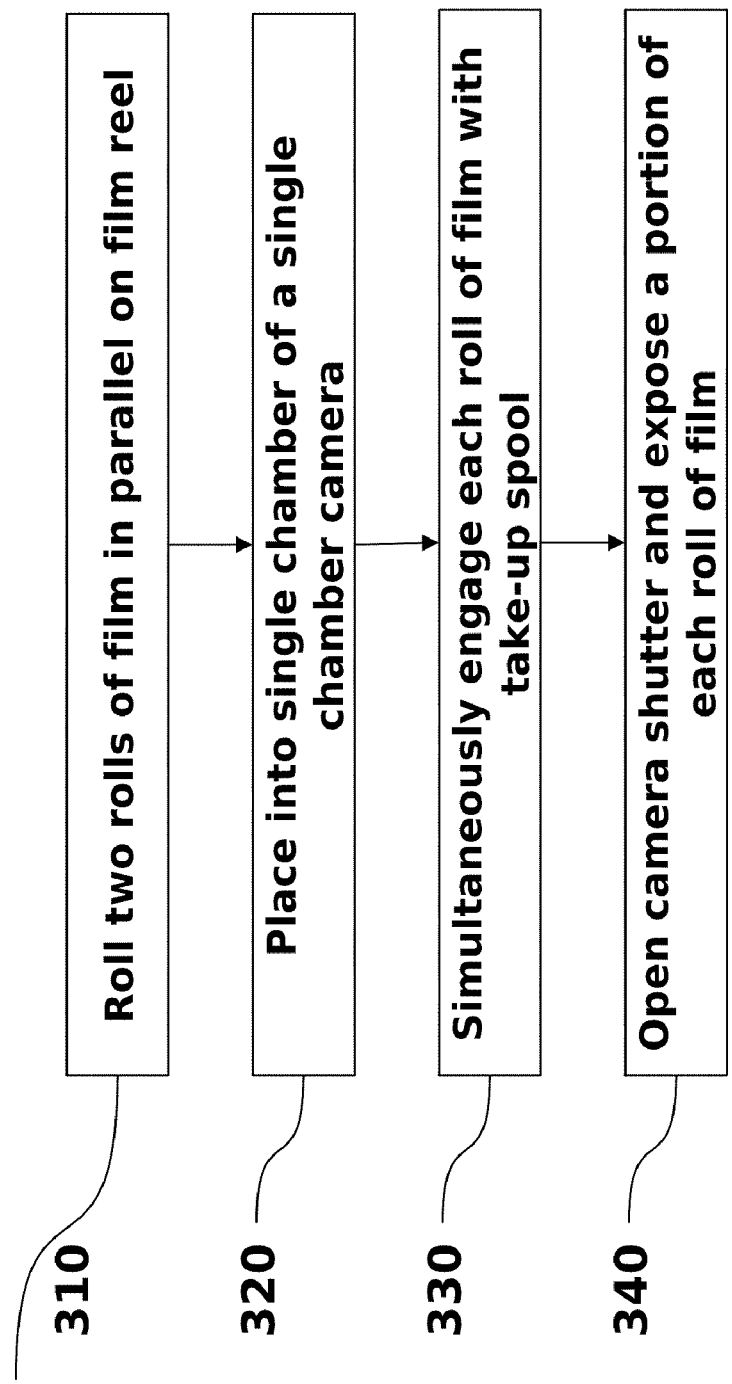
FIG. 8 shows steps taken in a method of taking pictures on multiple rolls of film in an embodiment of the disclosed technology.

FIG. 8 shows steps followed in a method of taking pictures on multiple rolls of film in an embodiment of the disclosed technology. The method described in this figure is for a camera adapted or designed for a single roll of film. In order to carry out the method using such a camera, in step 310, two rolls of film are rolled, in parallel, on a film reel, as described with reference to FIGS. 2, 3, and 4. In step 320, the film reel with the two rolls of film rolled around it, is placed into a single chamber of a camera. The back of the camera is closed and the camera is ready for taking pictures in a manner known in the art. The shutter opens, in step 340, and light enters through the lens of the camera onto both rolls of film simultaneously. They are exposed and produce a developed picture such as that shown in FIG. 7, with a top half, bottom half, and, often, undeveloped areas corresponding to the sprocket holes of the film and a central region or space corresponding to a space between each two rolls of film or a space between negative holders during development of the negatives.

Figure 9:
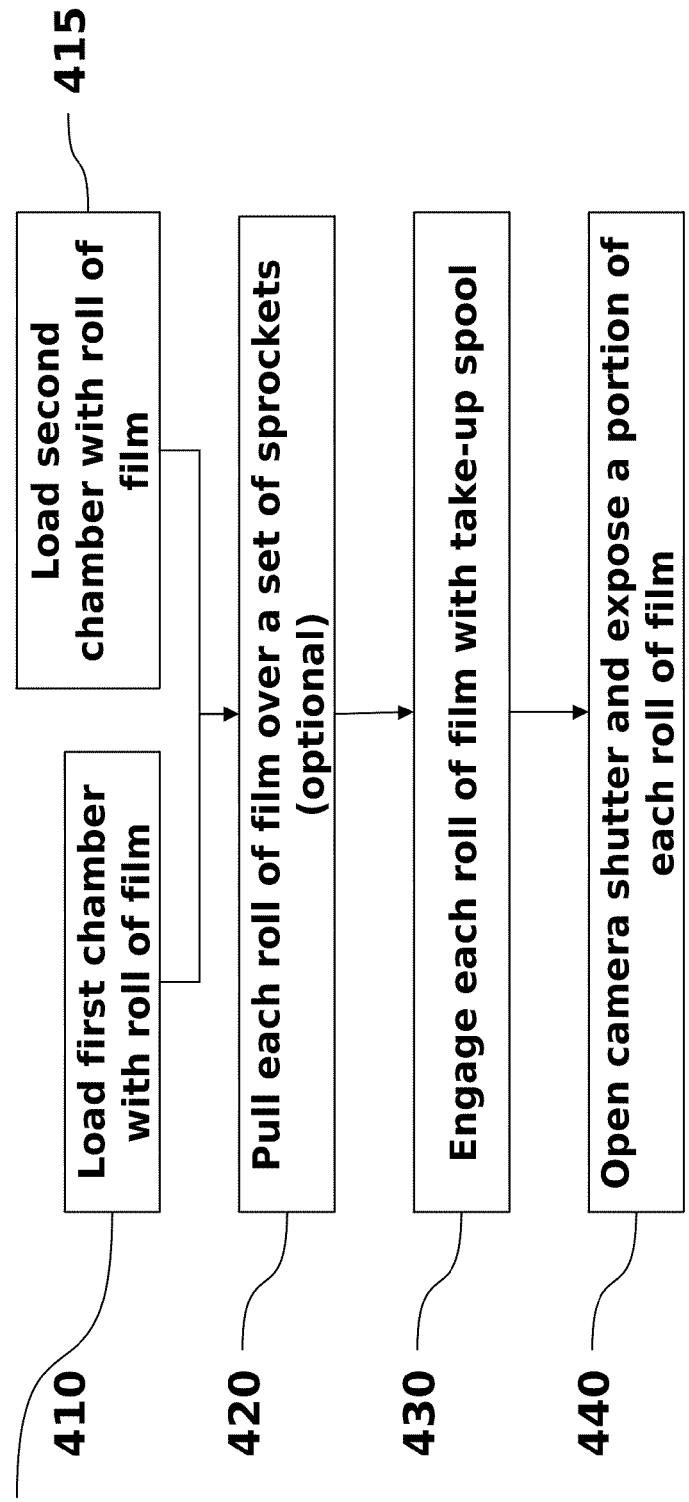
FIG. 9 shows steps taken in a method of taking pictures on multiple rolls of film using a specialized camera in an embodiment of the disclosed technology.

FIG. 9 shows steps in a method of taking pictures on multiple rolls of film using a specialized camera, in an embodiment of the disclosed technology. The camera described with respect to FIG. 9 produces an image such as that shown in FIG. 7, with a top and bottom portion, each portion created from exposure on a separate roll of film. While the result is the same, the camera used is a non-conventional or modified camera. There are two chambers (corresponding to chamber 19 of FIG. 1) and two take-up spools (corresponding to take-up spool 23 of FIG. 1). They are placed such that a narrow bottom/top end of each chamber or spool adjacent to each other, and film loaded thereon, can be pulled in parallel across a single or two exposure areas, that is, a space exposable to light when the shutter opens to take a picture.

Still referring to FIG. 9, in a method of carrying out an embodiment of the disclosed technology using such a camera or modified camera, whereby two separate film chambers and take-up spools are used, a first chamber is loaded with a roll of film in step 410, and a second chamber is loaded with a roll of film in step 415. Each roll is optionally pulled across a set of sprocket teeth (corresponding to sprocket teeth 22 of FIG. 1). Then, in step 430, each roll is engaged with a take-up spool. The chamber may be a single chamber separated by a connector or adapter adapted to interface with a respective top and bottom portion of a roll of film.

Further, in embodiments of the disclosed technology, as digital photography is replacing film photography at the time of this writing, it may be desired to produce an image such as that shown in FIG. 7 using a digital filter. Such a filter takes an image which was formed or converted into a digital format and adds features which would be produced using other devices and methods of the disclosed technology. That is, such a digital picture includes a top and bottom half corresponding to emulated rolls of film. Each top and bottom half may appear different (e.g., different focus or color palette), and features may be shown, such as sprocket holes and central region outlines as undeveloped areas. Each top and bottom half can be moved and manipulated before producing the final result.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

I claim:

1. A method of loading film into a camera, said camera comprising a single film chamber, the method comprising:
   in a non-overlapping manner, rolling, in parallel, two rolls of film onto a film reel, said film reel adapted for placement in said single film chamber;
   inserting said film reel into said camera; and
   engaging simultaneously, each said roll of film with a take-up spool of said camera.

2. The method of claim 1, wherein said film chamber of said camera is adapted for 70 mm film and said two rolls of film are each 35 mm film.

3. The method of claim 1, wherein an undevelopable area on a resulting photograph produced by said camera after carrying out said method comprises undevelopable areas corresponding to four rows of sprocket holes and a space between developed negatives.

4. The method of claim 1, wherein the two said rolls of film differ in their widths.

5. The method of claim 1, wherein, when a shutter of said camera opens, portions of each said roll of film are exposed simultaneously.

6. A camera adapted for exposure of an image on two rolls of film simultaneously comprising:
   two film chambers with each one's narrow side adjacent to that of the other;
   two take-up reels with a narrow side of each said take-up reel adjacent to another;
   an optical system configured to simultaneously expose both a portion of said first roll of film and an equal length portion of said second roll of film.

7. The camera of claim 6, wherein a developed photograph produced from said equal length of said first and second rolls of film comprises an upper and lower portion, each said portion further comprising an undevelopable region in the shape of sprocket holes of a respective said roll of film.

8. The camera of claim 7, wherein said first roll of film is chemically different from said second roll of film.

9. The camera of claim 8, wherein said first roll of film and said second roll of film, when developed, produce photographs which differ from each other in color intensity.

10. A camera adapted for exposure of an image on a single roll of film, comprising:
    a single film chamber loaded with a single spool, said spool wrapped with two separate lengths of film arranged next to each other on said spool;
    an upper and lower rail defining a shutter opening space and extending at least partially between said film chamber and a take-up spool, whereby each of said two separate lengths of film pass over said shutter opening space; and
    said first length of film and said second length of film are spaced apart.

11. The camera of claim 10, wherein said first length of film and said second length of film are of identical length and width.

12. The camera of claim 11, wherein said first length of film and said second length of film differ chemically.

13. The camera of claim 12, where said first length of film is color film and said second length of film is black and white film.

14. A photograph comprising:
- an upper portion comprising an image of undeveloped upper and lower sprocket holes on film;
- a lower portion, parallel to said upper portion, comprising an image of undeveloped upper and lower sprocket holes on film;
- a central region between said upper and lower portions comprising a width less than 10% of the width of said upper and said lower portion, comprising an image of an undeveloped space between film;
- wherein said photograph is produced in a single camera by way of light entering through a single lens, and said upper portion and said lower portion of said photograph were simultaneously exposed to light.

15. The photograph of claim 14, wherein a said portion of said photograph is in color and a portion of said photograph is in black and white.

16. The photograph of claim 15, wherein said photograph is procured from two rolls of 35 mm film.

17. The photograph of claim 15, wherein said image is produced by way of digital manipulation.

* * * * *